United States Patent
Kotecha et al.

(10) Patent No.: US 11,134,416 B2
(45) Date of Patent: Sep. 28, 2021

(54) CONTROL PLANE TRAFFIC LOAD BALANCING, PROTECTION, AND NETWORK SELECTION

(71) Applicant: Verizon Patent and Licensing Inc., Arlington, VA (US)

(72) Inventors: Lalit R. Kotecha, San Ramon, CA (US); Donna L. Polehn, Mercer Island, WA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 16/654,112

(22) Filed: Oct. 16, 2019

(65) Prior Publication Data

US 2021/0120452 A1 Apr. 22, 2021

(51) Int. Cl.
 *H04W 28/08* (2009.01)
 *H04W 28/02* (2009.01)
 *H04W 48/18* (2009.01)

(52) U.S. Cl.
 CPC ....... *H04W 28/08* (2013.01); *H04W 28/0236* (2013.01); *H04W 48/18* (2013.01)

(58) Field of Classification Search
 CPC .. H04W 28/08; H04W 28/0236; H04W 48/18
 See application file for complete search history.

(56) References Cited

U.S. PATENT DOCUMENTS

| | | | | |
|---|---|---|---|---|
| 10,798,617 | B1* | 10/2020 | Ghadge | H04W 36/32 |
| 2010/0188975 | A1* | 7/2010 | Raleigh | H04L 63/04 370/230.1 |
| 2016/0099860 | A1* | 4/2016 | Huang | H04L 12/6418 370/389 |
| 2016/0119830 | A1* | 4/2016 | Iwai | H04W 76/10 370/331 |
| 2017/0064601 | A1* | 3/2017 | Kubota | H04W 74/00 |
| 2017/0332212 | A1* | 11/2017 | Gage | H04L 41/0806 |
| 2017/0366399 | A1* | 12/2017 | Li | H04W 12/06 |
| 2018/0007493 | A1* | 1/2018 | Yang | H04W 24/02 |
| 2018/0139129 | A1* | 5/2018 | Dowlatkhah | G06F 21/45 |
| 2018/0192390 | A1* | 7/2018 | Li | H04W 36/14 |
| 2019/0174321 | A1* | 6/2019 | Sun | H04W 48/16 |
| 2019/0373472 | A1* | 12/2019 | Smith | H04L 41/08 |

* cited by examiner

*Primary Examiner* — Kevin D Mew

(57) ABSTRACT

A network device receives control plane (CP) traffic transiting a first mobile network. The network device determines CP traffic loads handled by network functions of the first mobile network and determines availability of CP resources within the first mobile network. The network device performs at least one of load balancing, network selection or overload protection, when switching the CP traffic from a source to a destination, based on the determined CP traffic loads and/or the determined availability of CP resources.

19 Claims, 8 Drawing Sheets

CONTROL PLANE TRAFFIC LOAD BALANCING, PROTECTION, AND NETWORK SELECTION

BACKGROUND

Next Generation mobile networks, such as Fifth Generation New Radio (5G NR) mobile networks, are expected to transmit and receive in the Gigahertz frequency band with a broad bandwidth near 500-1,000 Megahertz. The expected bandwidth of Next Generation mobile networks is intended to support, amongst other things, higher speed downloads. 5G NR, among other features, may operate in the millimeter wave bands (e.g., 14 Gigahertz (GHz) and higher), and may support more reliable, massive machine communications (e.g., machine-to-machine (M2M), Internet of Things (IoT)). Next Generation mobile networks are expected to enable a higher utilization capacity than current wireless systems, permitting a greater density of wireless users. Next Generation mobile networks are designed to increase data transfer rates, increase spectral efficiency, improve coverage, improve capacity, and reduce latency.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

During operation of a Next Generation mobile network, existing network functions of the mobile network can become overloaded in certain circumstances. For example, if the control plane for the Next Generation mobile network is implemented using the Hypertext Transfer Protocol/2 (HTTP/2) network protocol, network functions, such as for example, the Unified Data Management (UDM) function, may be prone to overloading due to the simultaneous processing of too many control plane messages. Exemplary embodiments described herein, thus, implement a Communication Control Function (CCF) within a Next Generation mobile network that acts as a switch to provide overload protection, load balancing, and network selection to control plane traffic that is sent to, and among, the various different network functions of the network. The CCF buffers the packets of control plane traffic sent to, or between, network functions in the Next Generation mobile network, such as control plane packets sent from a first network function to a second network function. The CCF also determines control plane traffic loads and the availability of control plane resources and may load balance the buffered control plane traffic across multiple instances of a particular network function(s) based on the determined traffic load and resource availability.

The CCF may further select one of multiple instances of the Next Generation mobile network, such as a far edge, edge, or core network, for handling the control plane traffic based on, for example, a latency tolerance of the control plane traffic, and offloads the control plane traffic to the selected network. The CCF additionally identifies an overload condition(s) (e.g., buffer overflow) of the CCF itself, or of a network function(s) in the Next Generation mobile network, and offloads control plane traffic to another instance of the CCF, or to another network function, based on the identified overload condition(s). The CCF described herein, through application of overload protection and load balancing to the control plane traffic, serves to prevent message congestion and the occurrence of buffer overflow conditions within the control plane of a Next Generation mobile network.

Figure 1:
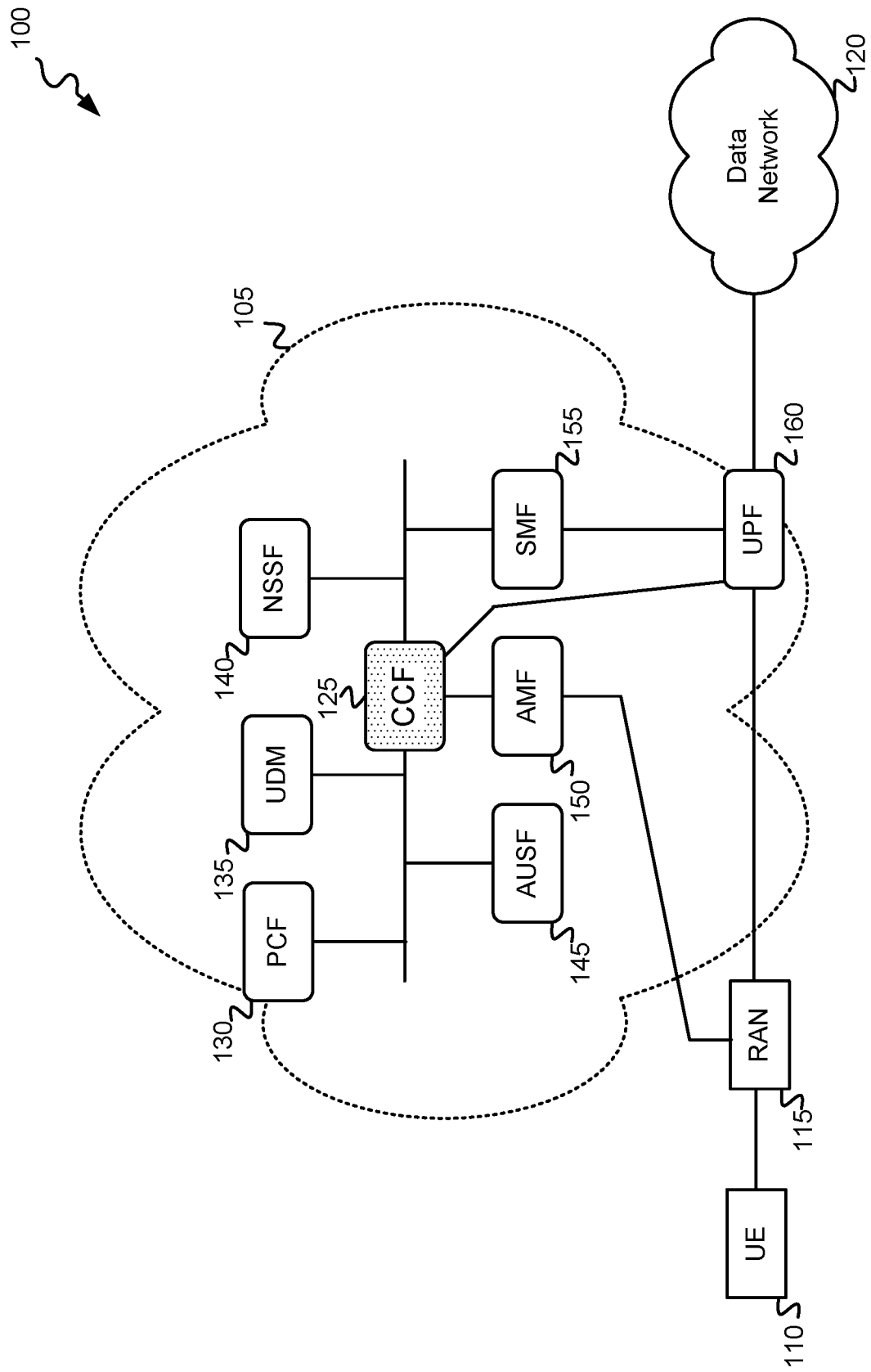
FIG. 1 illustrates an exemplary network environment in which overload protection, load balancing and network selection of control plane traffic may be implemented.

FIG. 1 illustrates an exemplary network environment 100 in which overload protection, load balancing and network selection of control plane (CP) traffic may be implemented. Network environment 100 may include at least one instance of a Next Generation mobile network 105 (referred to herein as "Next Generation mobile network 105" or "network 105"), a user equipment (UE) 110, a Radio Access Network (RAN) 115, and a Data Network 120.

Network 105 may include any type of a Next Generation Mobile network that includes evolved network components (e.g., future generation components) relative to a Long-Term Evolution (LTE) network, such as a 4G or a 4.5G LTE mobile network. In one implementation, Next Generation Mobile network 105 may include a 5G mobile network. In some implementations, network 105 may include any type of mobile network, including a 4G or 4.5G LTE mobile network, that may not be a Next Generation Mobile network. As shown in FIG. 1, network 105 may include various different network functions, such as, for example, a Communication Control Function (CCF) 125, a Policy Control Function (PCF) 130, a Unified Data Management (UDM) function 135, a Network Slice Selection Function (NSSF) 140, an Authentication Server Function (AUSF) 145, an Access and Mobility Management Function (AMF) 150, a Session Management Function (SMF) 155, and a User Plane Function (UPF) 160. Each of the network functions 125-160 may be implemented by one or more network devices within network 105. In some implementations, a single network device may implement multiple ones of network functions 125-160. Network 105 may include other network functions not shown in FIG. 1.

CCF 125 may, as described in more detail below, implement CP traffic management that involves overload protection, load balancing, and network selection for the CP traffic within network 105. CCF 125 may reside between network functions 130-160 and may operate as a switch that switches CP traffic between the network functions. As described further with respect to FIG. 2 below, multiple instances of CCF 125 may reside in multiple different instances of network 105, such as a far edge network, an edge network, and a core network. The multiple instances of CCF 125 may cooperate to offload CP traffic from, for example, a far edge network to an edge network, from the edge network to a core network, or from the far edge network to the core network.

PCF 130 may provide policy rules for control plane functions (e.g., for network slicing, roaming, and/or mobility management), and may access user subscription information for policy decisions. UDM function 135 may generate authentication and key agreement (AKA) credentials and may perform access authorization and subscription management. NSSF 140 may select a particular network slice instance to serve the UE 110, and may determine a set of AMFs to be used to serve the UE 110. AUSF 145 acts as an authentication server in conjunction with UDM function 135. AMF 150 may perform connection management, mobility management, access authentication and authorization, and/or security management. SMF 155 performs session management (e.g., session establishment, modification, and release), allocates network addresses to UEs 110, and selects and controls the UPF 160 for data transfer. UPF 160 performs packet routing and forwarding, packet inspection, and Quality of Service (QoS) handling. UPF 160 may act as a router and a gateway between network 105 and data network 120 and may forward session data between data network 120 and components of RAN 115 (e.g., a base band unit of RAN 115).

Though only a single instance of each network function is shown as residing in network 105, network 105 may include multiple instances of certain ones of network functions 130-160. For example, network 105 may include multiple instances of AMF 150, UDM 135, SMF 155, and/or UPF 160 that may reside at various locations in network 105, or that may reside in a same location or area of network 105.

UE 110 may include any type of computational device that communicates via network 105. UE 110 may include, for example, a computer (e.g., desktop, laptop, tablet, or wearable computer), a personal digital assistant (PDA), a cellular phone (e.g., a "smart" phone), Voice over Internet Protocol (VoIP) phone, a smart Television (TV), an audio speaker (e.g., a "smart" speaker), a video gaming device, a music player (e.g., a digital audio player), a digital camera, a set-top box (STB), or a "Machine-to-Machine" (M2M) or "Internet of Things" (IoT) device. A "user" (not shown) may own, operate, administer, and/or carry UE 110. Though only a single UE 110 is shown in FIG. 1, network environment 100 may include multiple different UEs 110 that communicate via RAN 115 and network 105.

RAN 115 includes components for communicating with UE 110 via radio frequency (RF) links, and for interconnecting RAN 115 with network 105. RAN 115 may include, for example, a first base band unit (BBU1) and multiple remote radio heads (not shown). BBU1 may connect to the multiple RRHs via, for example, optical fibers. BBU1 includes a network device that operates as a digital function unit that transmits digital baseband signals to the multiple RRHs and receives digital baseband signals from the multiple RRHs. If BBU1 is connected to the multiple RRHs via, for example, optical fibers, then BBU1 may convert the digital baseband signals into corresponding optical signals for transmission to the RRHs and may receive optical signals from the RRHs and convert the optical signals into corresponding digital baseband signals.

The RRHs include network devices that operate as radio function units that transmit and receive radio frequency (RF) signals to/from UE 110. If the RRHs are connected to BBU1 via an optical fiber, the RRHs may convert received RF signals to optical signals and transmit the optical signals to BBU1. Additionally, the RRHs may receive optical signals from BBU1 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If network 105 is a 5G New Radio (NR) network, the BBU1 and the associated RRH(s) represent a distributed Next Generation NodeB, which may also be referred to as a "gNB," or an enhanced LTE (eLTE) eNB that can connect to network 105.

Data network 120 may include any type of packet-switching network(s) that can connect to network 105 for transporting data between network 105 and nodes or devices that are external to network 105 and connected to data network 120. Data network 120 may include, for example, the Internet, a local area network(s) (LAN), a wide area network(s) (WAN), or a metropolitan area network (MAN).

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1.

Figure 2:
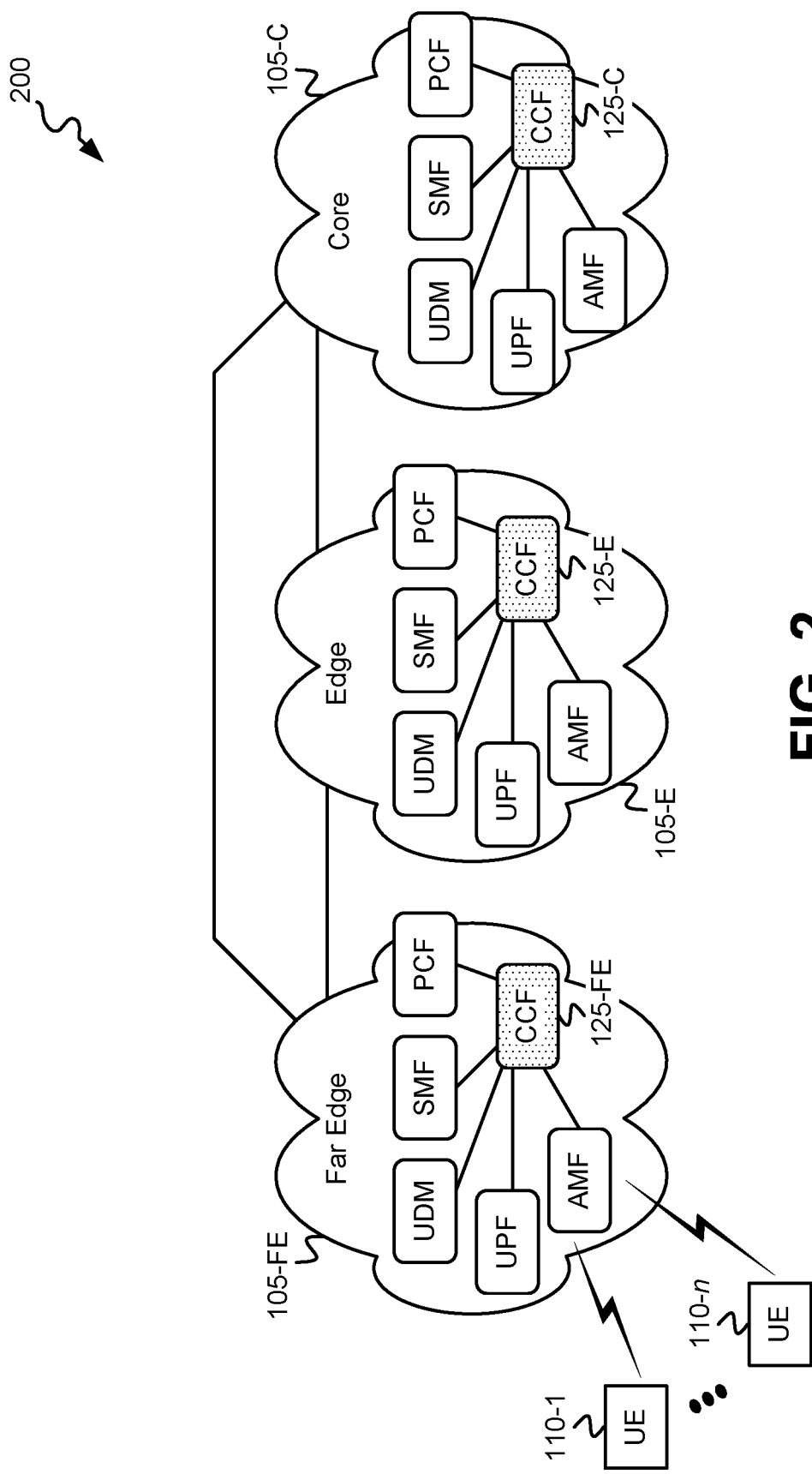
FIG. 2 depicts an exemplary network environment that includes multiple instances of a Next Generation Mobile network, including a core network, an edge network, and a far edge network.

FIG. 2 depicts an exemplary network environment 200 that includes multiple instances of Next Generation Mobile network 105, including a core network 105-C, an edge network 105-E, and a far edge network 105-FE. As shown, far edge network 105-FE interconnects with both edge network 105-E and core network 105-C, and edge network 105-E interconnects with core network 105-C.

Core network 105-C includes core components of a Next Generation mobile network that serve to provide wireless access to subscribing UEs. In the case of a 5G wireless network, the core components may include, for example, the network functions described with respect to the network 105 of FIG. 1 above, including, among other network functions, CCF function 125-C, the AMF function, the UPF function, the UDM function, the SMF function, and the PCF function, as shown in FIG. 2.

Edge network 105-E includes one or more edge computing data centers, or other edge devices, that enable the movement of traffic and network services from core cloud network 105-C towards the edge of network environment 200 and closer to certain destination devices (e.g., certain UEs 110). Instead of sending data to core network 105-C for processing, routing, and transport, edge network 105-E includes components that handle the data closer to certain destination devices, thereby reducing latency. Edge network 105-E may, in some implementations, include a Multi-Access Edge Computing (MEC) network. Though not shown in FIG. 2, edge network 105-E may connect to data network 120 (FIG. 1) in addition to connecting to core network 105-C and far edge network 105-FE. As shown in FIG. 2, edge network 105-E may include duplicate instances of the network functions implemented in core network 105-C.

Far edge network 105-FE includes one or more edge computing data centers, or other edge devices, that enable the movement of traffic and network services from edge network 105-E towards the far edge of network environment 200 and closer to certain destination devices (e.g., certain UEs 110). Instead of sending data to core network 105-C or edge network 105-E for processing, routing, and transport, far edge network 105-FE includes components that handle the data closer to certain destination devices, thereby reducing latency. Far edge network 105-FE may, in some implementations, include a Multi-Access Edge Computing (MEC) network. Though not shown in FIG. 2, far edge network 105-FE may connect to data network 120 (FIG. 1) in addition to connecting to edge network 105-E and core network 105-C. As shown in FIG. 2, far edge network 105-FE may include duplicate instances of the network functions implemented in core network 105-C and edge network 105-E.

CCF 125-FE may offload CP traffic to edge network 105-E and/or core network 105-C for purposes of latency-based network selection, load balancing, and/or overload protection. Edge network 105-E may also offload CP traffic to core network 105-C and/or far edge network 105-FE for purposes of latency-based network selection, load balancing, and/or overload protection. Additionally, core network 105-C may offload CP traffic to edge network 105-E and/or far edge network 105-FE for purposes of latency-based network selection, load balancing, and/or overload protection. Examples of latency-based network selection, load balancing and overload protection are described in further detail below with respect to FIGS. 4, 5, 6A, and 6B.

Figure 3:
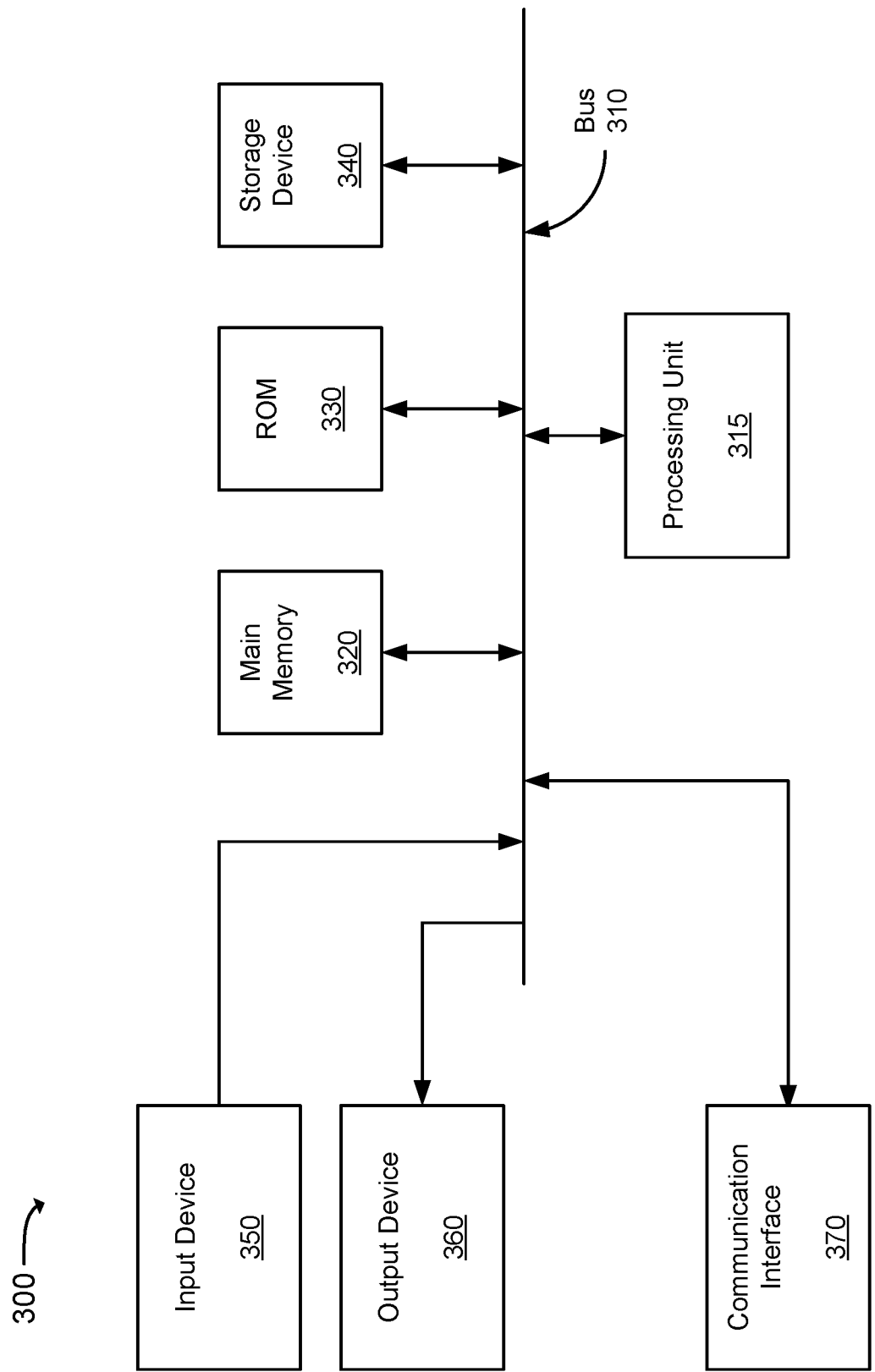
FIG. 3 is a diagram of exemplary components of a network device.

FIG. 3 is a diagram of exemplary components of a network device 300. UE 110, CCF 125, PCF 130, UDM 135, NSSF 140, AUSF 145, AMF 150, SMF 155, and UPF 160 may each include the same, or similar components, as network device 300 shown in FIG. 3. Network device 300 may include a bus 310, a processing unit 315, a main memory 320, a read only memory (ROM) 330, a storage device 340, an input device 350, an output device 360, and a communication interface(s) 370. Bus 310 may include a path that permits communication among the elements of network device 300.

Processing unit 315 may include one or more processors or microprocessors which may interpret and execute stored instructions associated with one or more processes, or processing logic that implements the one or more processes. For example, processing unit 315 may include, but is not limited to, programmable logic such as Field Programmable Gate Arrays (FPGAs) or accelerators. Processing unit 315 may include software, hardware, or a combination of software and hardware for executing the processes described herein. Main memory 320 may include a random access memory (RAM) or another type of dynamic storage device that may store information and, in some implementations, instructions for execution by processing unit 315. ROM 330 may include a Read Only Memory (ROM) device or another type of static storage device (e.g., Electrically Erasable Programmable ROM (EEPROM)) that may store static information and, in some implementations, instructions for use by processing unit 315. Storage device 340 may include a magnetic and/or optical recording medium and its corresponding drive. Main memory 320, ROM 330 and storage device 340 may each be referred to herein as a "non-transitory computer-readable medium" or a "non-transitory storage medium."

Input device 350 may include one or more devices that permit a user or operator to input information to network device 300, such as, for example, a keypad or a keyboard, a display with a touch sensitive panel, voice recognition and/or biometric mechanisms, etc. Output device 360 may include one or more devices that output information to the operator or user, including a display, a speaker, etc. Input device 360 and output device 360 may, in some implementations, be implemented as a graphical user interface (GUI) that displays GUI information, and which receives user input via the GUI. In some implementations, such as when CCF 125, PCF 130, UDM 135, NSSF 140, AUSF 145, AMF 150, SMF 155, and UPF 160 are implemented by one or more network devices 300, input device 350 and/or output device 360 may be omitted from network device(s) 300.

Communication interface(s) 370 may include one or more transceivers that enable network device 300 to communicate with other devices and/or systems. For example, in the case where network device 300 is a UE 110, communication interface(s) 370 may include a wireless transceiver (including at least one antenna) for communicating with one or more RRHs of a RAN 115. In the cases of CCF 125, PCF 130, UDM 135, NSSF 140, AUSF 145, AMF 150, SMF 155, or UPF 160 being implemented by a network device 300, communication interface(s) 370 may include at least one wired transceiver for wired communication via network 105.

Network device 300 may perform certain operations or processes, as may be described herein. Network device 300 may perform these operations in response to processing unit 315 executing software instructions contained in a computer-readable storage medium, such as memory 320. A computer-readable storage medium may be defined as a physical or logical memory device. A logical memory device may include memory space within a single physical memory device or spread across multiple physical memory devices. The software instructions may be read into main memory 320 from another computer-readable storage medium, such as storage device 340, or from another device via communication interface(s) 370. The software instructions contained in main memory 320 may cause processing unit 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes only. Other configurations may be implemented. Therefore, network device 300 may include additional, fewer and/or different components, arranged in a different configuration, than depicted in FIG. 3.

Figure 4:
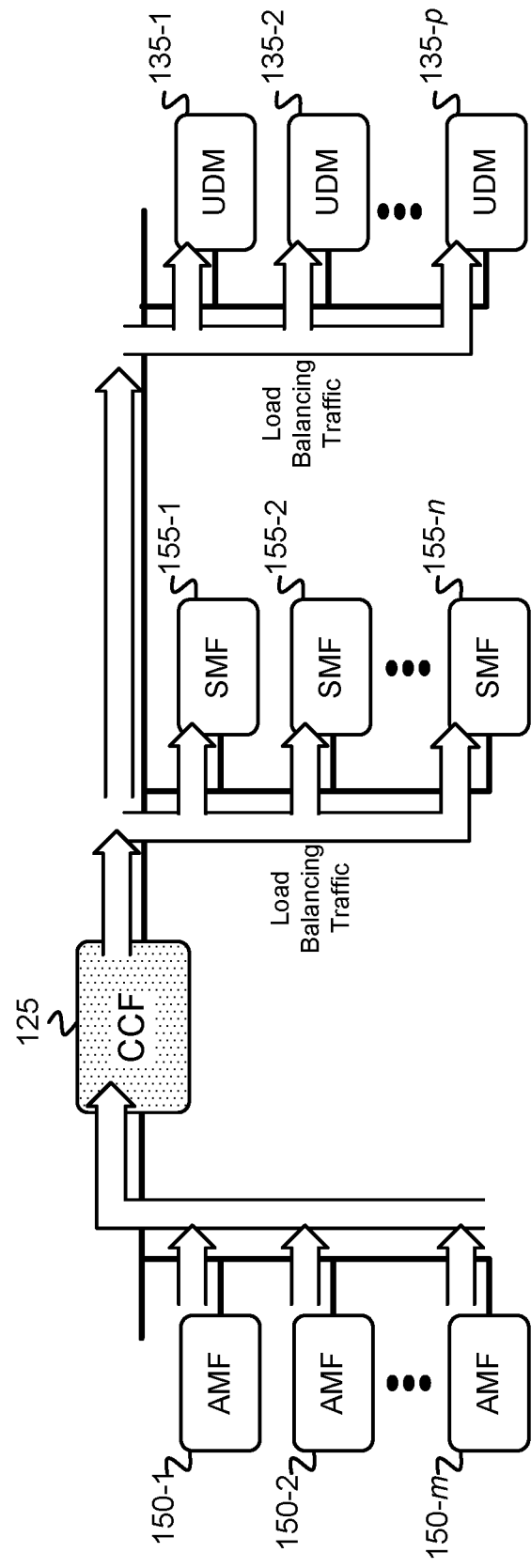
FIG. 4 illustrates an example of control plane traffic load balancing, performed by the Communication Control Function of FIGS. 1 and 2, across multiple different instances of one or more network functions.

FIG. 4 illustrates an example of control plane traffic load balancing, performed by CCF 125, across multiple different instances of one or more network functions. In the example of FIG. 4, CCF 125 may receive CP traffic from m different instances of AMF 150 (i.e., AMF 150-1 through 150-*m*— where m is greater than or equal to one) that is destined for processing by a SMF 155, and CCF 125 may selectively load balance the CP traffic across n different instances of SMF 155-1 through 155-*n* (where n is greater than or equal to two). For example, AMF 150-1 may forward CP traffic, destined for processing by a SMF 155, to CCF 125. CCF 125 may, to load balance the CP traffic, selectively switch a first portion of the received CP traffic to SMF 155-1, a second portion of the received CP traffic to SMF 155-2, and an nth portion of the received CP traffic to SMF 155-*n*.

Additionally, in the example of FIG. 4, CCF 125 may receive CP traffic from the m instances of AMF 150 that is destined for processing by a UDM 135, and CCF 125 may selectively load balance the CP traffic across p different instances of UDM 135 (i.e., UDM 135-1 through 135-p— where p is greater than or equal to two). For example, AMF 150-2 may forward CP traffic, destined for processing by a UDM 135, to CCF 125. CCF 125 may, to load balance the CP traffic, selectively switch a first portion of the received CP traffic to UDM 135-1, a second portion of the received CP traffic to UDM 135-2, and a pth portion of the received CP traffic to UDM 135-p.

In FIG. 4, the multiple instances of AMF 150-1 through 150-m, the multiple instances of SMF 155-1 through 155-n, and/or the multiple instances of UDM 135-1 through 135-p may reside in a single network 105 (e.g., within far edge network 105-FE, edge network 105-E, or core network 105-C). In other implementations, the multiple instances of AMF 150-1 through 150-m, the multiple instances of SMF 155-1 through 155-n, and/or the multiple instances of UDM 135-1 through 135-p may be distributed across multiple networks 105 (e.g., distributed across networks 105-FE, 105-E, and/or 105-C).

Figure 5:
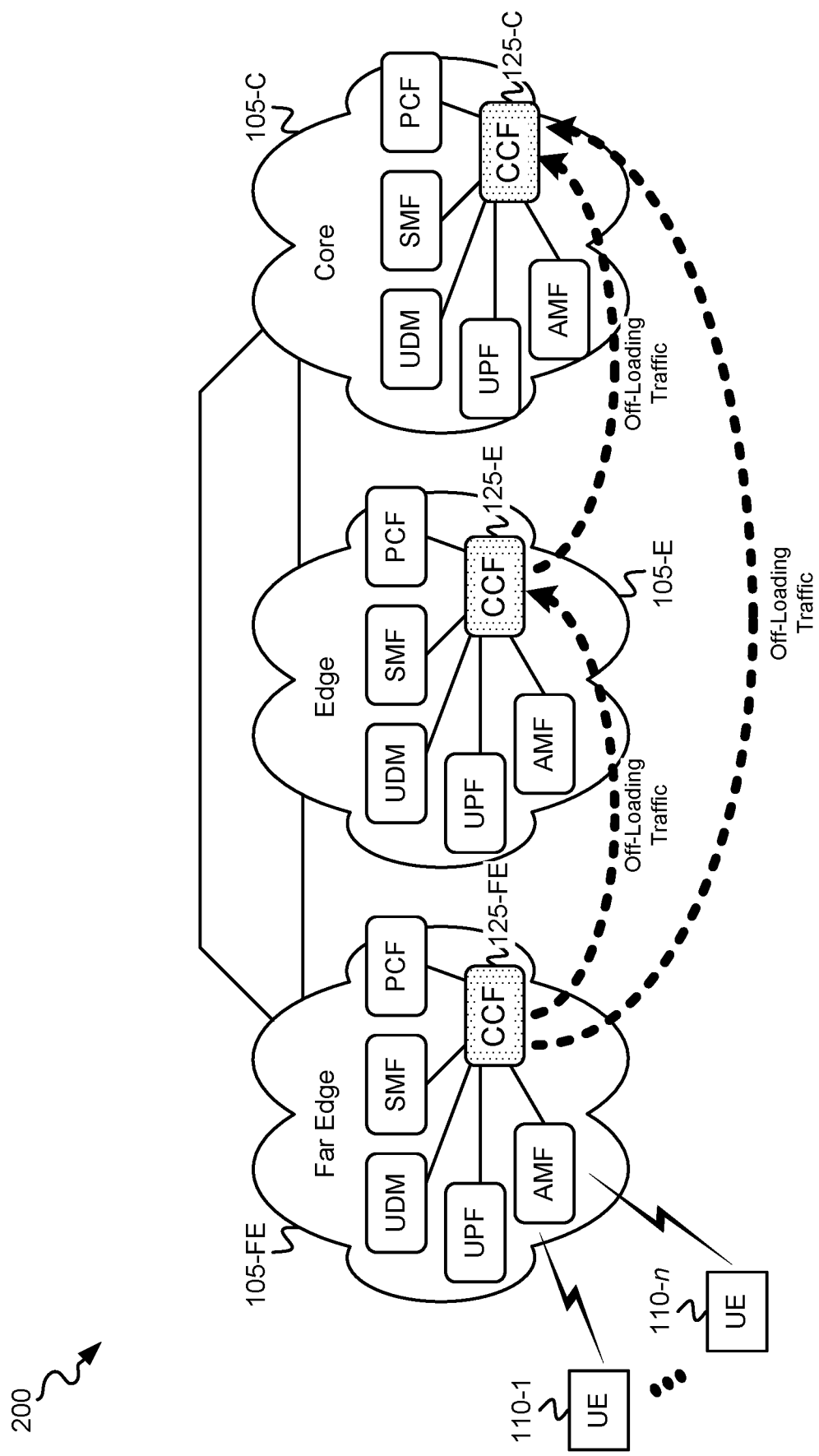
FIG. 5 illustrates examples of control plane offloading for purposes of latency-based network selection or for overload protection.

FIG. 5 illustrates examples of CP traffic offloading for purposes of latency-based network selection, or for overload protection. In the case of latency-based network selection, CCF 125-FE may receive CP traffic from one or more network functions in far edge network 105-FE and may determine a type of network service associated with the CP traffic. CCF 125-FE may additionally determine the latency tolerance of the determined type of network service and may switch the CP traffic to edge network 105-E for further switching by CCF 125-E if the CP traffic has a first level of delay tolerance. CCF 25-FE may switch the CP traffic to core network 105-C for further switching by CCF 125-C if the CP traffic has a second level of delay tolerance, where the second level of delay tolerance is greater than the first level of delay tolerance.

In the case of overload protection, CCF 125-FE may receive CP traffic from one or more network functions in far edge network 105-FE, and may determine whether CCF 125-FE itself, or whether a destination CP network function, is overloaded with CP traffic. In the case of a CP traffic overload condition, CCF 125-FE may offload the CP traffic to CCF 125-E, or to CCF 125-C. A CP traffic overload condition may occur when a buffer at a CCF 125, or at a destination CP network function, overflows. Overloading of a CCF 125, or a destination CP network function, with CP traffic may be determined to be actually occurring or may be predicted to be about to occur. In the latter situation, the CCF 125 may proactively offload CP traffic to another CCF 125 (e.g., from CCF 125-FE to CCF 125-E, or from CCF-FE to CCF 125-C) so as to attempt to avoid the occurrence of a buffer overflow.

Figure 6A:
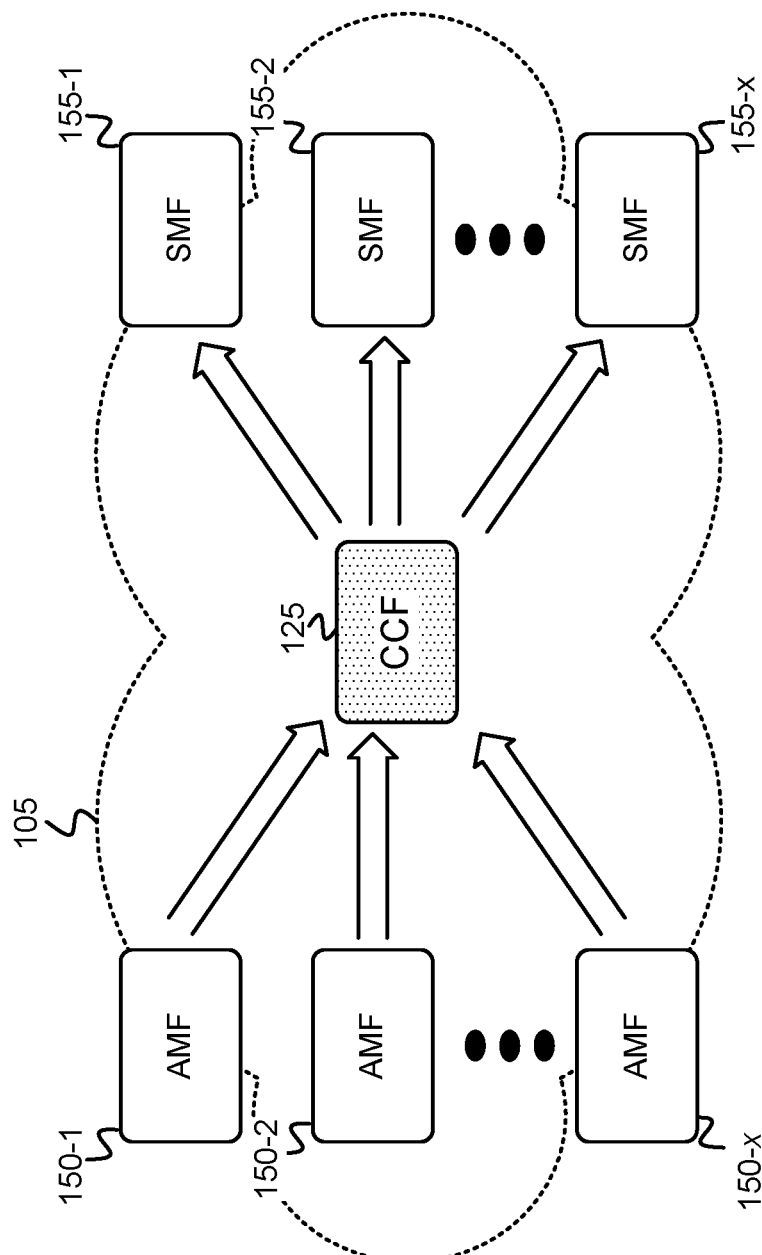
FIG. 6A depicts the exemplary switching of control plane traffic from one or more source network functions to one or more destination network functions, in a same network, for load balancing or overload protection.

FIG. 6A depicts the exemplary switching of CP traffic from one or more source network functions to one or more destination network functions, in a same network 105, for load balancing, or for overload protection. In one example, a single AMF 150-1 may send CP traffic, destined for a SMF 155, to CCF 125. CCF 125 may determine currently available CP network functions, and a current CP traffic loading of the available CP network functions, and may selectively switch the received CP traffic to one or more destination network functions based on the current network function availability and/or the current CP traffic loading. For example, CCF 125 may switch the CP traffic across SMFs 155-1 through 155-x to load balance the CP traffic. As another example, CCF 125 may switch the CP traffic solely to SMF 155-2, instead of SMF 155-1, to avoid overloading SMF 155-1.

Figure 6B:
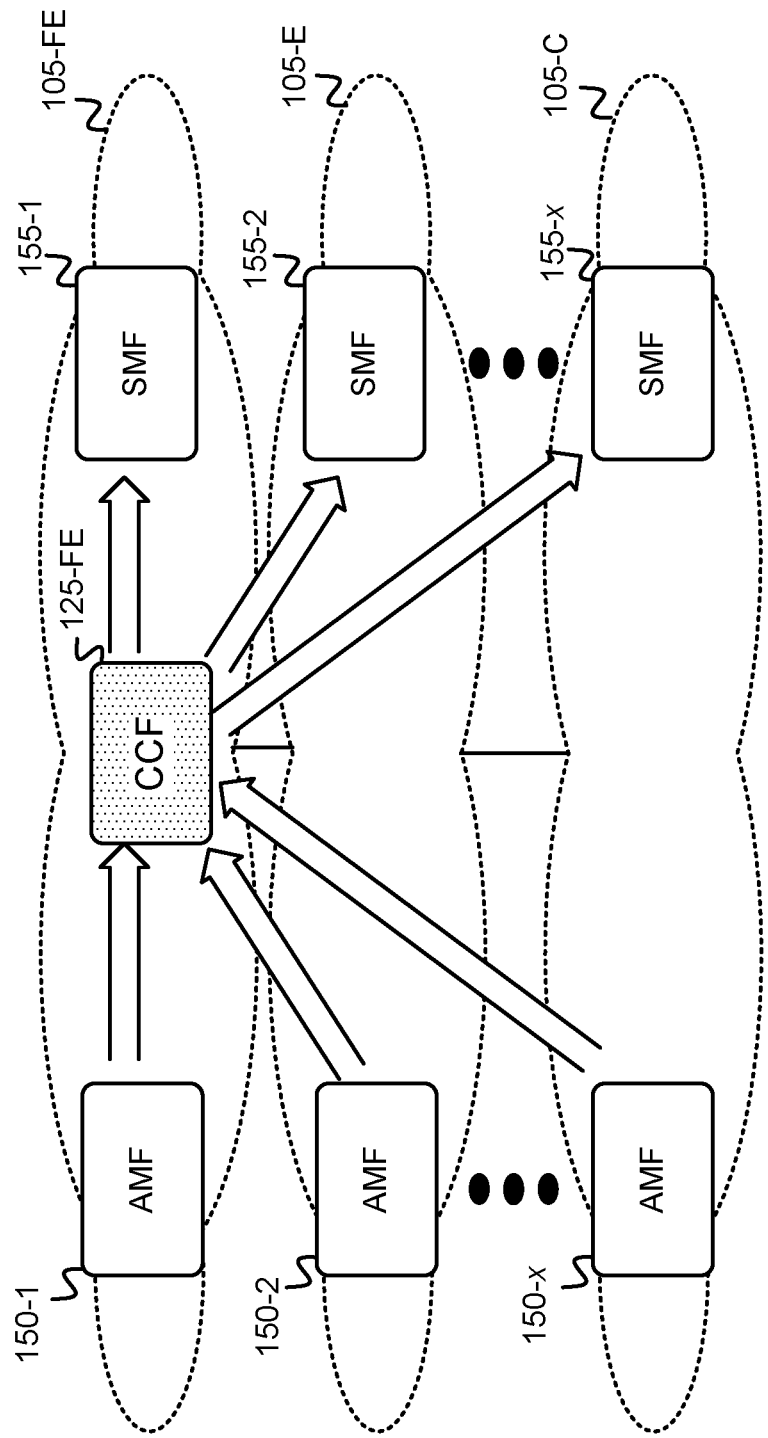
FIG. 6B depicts the exemplary switching of control plane traffic from one or more source network functions to one or more destination network functions, in different networks, for load balancing or overload protection.

FIG. 6B depicts the exemplary switching of CP traffic from one or more source network functions to one or more destination network functions, in different networks 105, for load balancing, or for overload protection. In one example, a single AMF 150-1 may send CP traffic, destined for a SMF 155, to CCF 125-FE in far edge network 105-FE. CCF 125-FE may determine currently available CP network functions, in networks 105-FE, 105-E, and/or 105-C, and a current CP traffic loading of the available CP network functions, and may selectively switch the received CP traffic to one or more destination network functions, in networks 105-FE, 105-E and/or 105-C, based on the current network function availability and/or the current CP traffic loading. In the example shown in FIG. 6B, AMF 150-1 and SMF 155-1 reside in network 105-FE, AMF 150-2 and SMF 155-2 reside in network 105-E, and AMF 150-x and SMF 155-x reside in network 105-C. CCF 125-FE may switch the CP traffic across SMFs 155-1 through 155-x, residing in different networks 105-FE, 105-E, and/or 105-C, to load balance the CP traffic. As another example, CCF 125-FE may switch the CP traffic (originating from AMF 150-1, 150-2, and/or 150-x) to SMF 155-x to avoid overloading SMFs 155-1 or 155-2.

Figure 7:
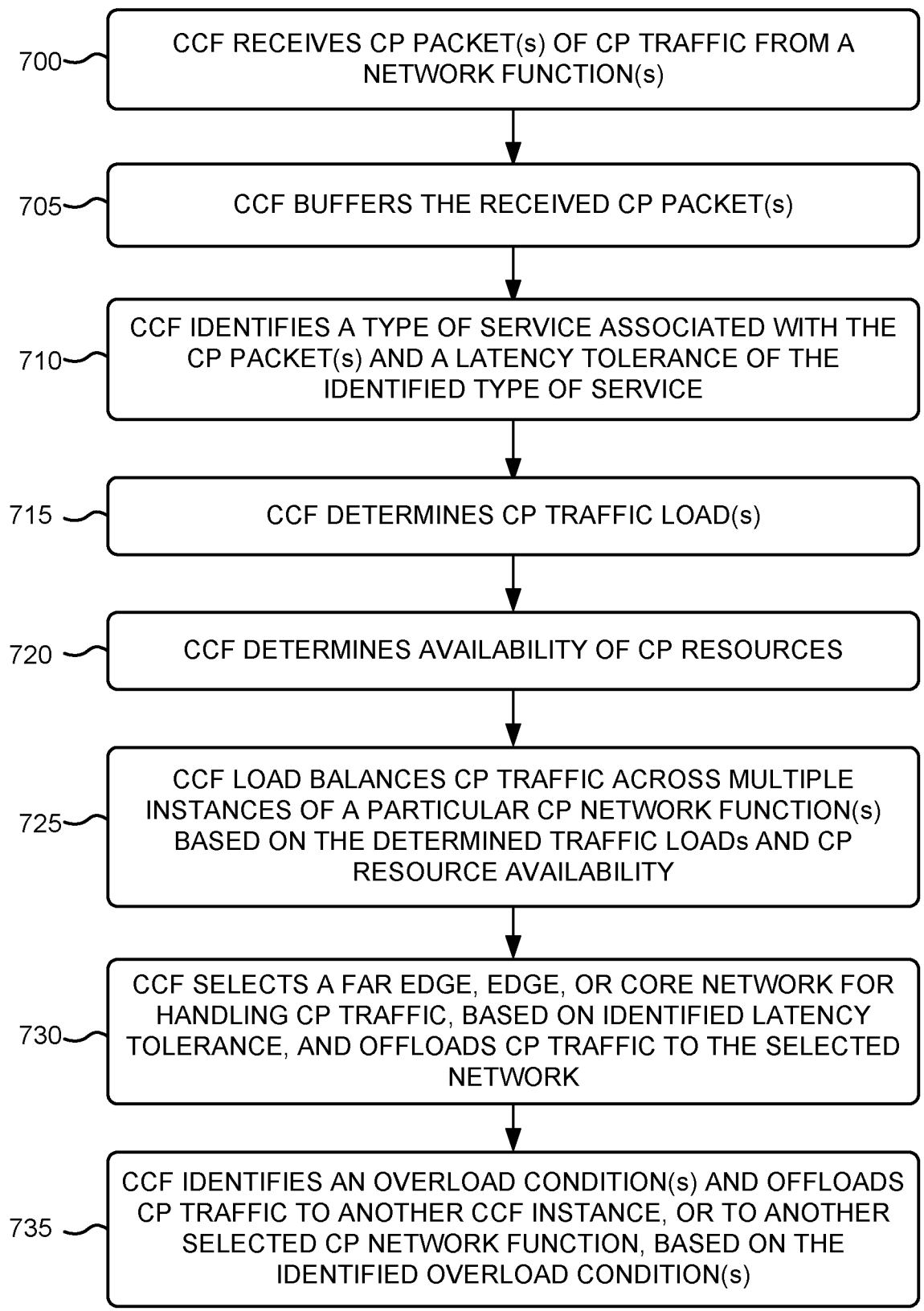
FIG. 7 is a flow diagram of an exemplary process for network selection, overload protection and load balancing of control plane traffic in a Next Generation mobile network.

FIG. 7 is a flow diagram of an exemplary process for network selection, overload protection and load balancing of CP traffic in a Next Generation mobile network 105. The exemplary process of FIG. 7 may be implemented by an instance of CCF 125. The exemplary process of FIG. 7 may be implemented by each instance of CCF 125 in one or more of networks 105 (e.g., by CCF 125-FE in far edge network 105-FE, CCF 125-E in edge network 105-E, and CCF 125-C in core network 105-C).

The exemplary process may include a CCF 125 receiving CP packet(s) of CP traffic from a network function (block 700) and buffering the received CP packet(s) (block 705). For example, referring to FIG. 1, AMF 150 may send a CP packet(s) to SMF 155 for establishing a session between UE 110 and a device (not shown) connected to Data Network 120. CCF 125 may receive and buffer the CP packet(s) prior to switching the CP packet(s) for network selection, overload protection, and/or load balancing.

CCF 125 identifies a type of service associated with the CP packet(s) and a latency tolerance of the identified type of service (block 710). CCF 125 may, for example, inspect the CP packet(s) to identify a type of service associated with the CP packet(s). The types of services may include, for example, a broadband service, an ultra-reliable low latency service, or a massive machine type communication service. The CP packet(s) may, however, be associated with other types of Next Generation mobile network services. A very low latency tolerance may be identified as being associated with the ultra-reliable low latency service, and a high latency tolerance may be identified as being associated with the massive machine type communications.

CCF 125 determines CP traffic loads (block 715), and an availability of CP resources (block 720). CCF 125, which routes and forwards traffic between the network functions of Next Generation mobile network(s) 105 (e.g., PCF 130, UDM 135, NSSF 140, AUSF 145, AMF 150, SMF 155, UPF 160), may keep track of current traffic loads at each network function. In some implementations, CCF 125 may additionally predict future traffic loads at each network function based on, for example, current traffic loads and a known history of traffic loads. Based on the current and/or predicted CP traffic loads at each network function and based on known buffer sizes of the buffers associated with each network function, CCF 125 determines the availability/capacity of each of the network functions to handle additional CP traffic.

CCF 125 load balances CP traffic across multiple instances of a particular CP network function(s) based on the determined CP traffic loads and the determined CP resource availability (block 725). CCF 125 may use existing load balancing techniques to load balance the CP traffic. In one example, referring to FIG. 6A, CCF 125 may receive CP traffic from AMF 150-1, and may load balance the CP traffic across SMFs 155-1 through 155-x.

CCF 125 selects a far edge, edge, or core network for handling CP traffic, based on an identified latency tolerance of the CP traffic, and offloads the CP traffic to the selected network (block 730). After identifying a latency tolerance of the type of service associated with CP traffic, CCF 125 may select either far edge network 105-FE, edge network 105-E, or core network 105-C for handling the CP traffic. For example, as shown in FIG. 5, if CCF 125-FE in far edge network 105-FE identifies the type of service associated with received CP traffic as being very latency tolerant (e.g., type of service X tolerates latencies>$x_1$ milliseconds (ms)), CCF 125-FE may offload the CP traffic to CCF 125-C in core network 105-C. Upon receipt of the CP traffic from CCF 125-FE, CCF 105-E may, in turn, also perform network selection, overload protection, or load balancing with respect to the received CP traffic. As another example, as further shown in FIG. 5, if CCF 125-FE in far edge network 105-FE identifies the type of service associated with the received CP traffic as being moderately latency tolerant (e.g., type of service Y tolerates latencies>$x_2$ ms, where $x_2$<$x_1$, but less than or equal to $x_1$ ms), CCF 125-FE may offload the CP traffic to CCF 125-E in edge network 105-E. Upon receipt of the CP traffic from CCF 125-E, CCF 125-C may, in turn, also perform network selection, overload protection, or load balancing with respect to the received CP traffic. As a further example, if CCF 125-FE in far edge network 105-FE identifies the type of service associated with received CP traffic as being latency intolerant (e.g., type of service Z only tolerates latencies<$x_3$ ms, where $x_3$<$x_2$<CCF 125-FE may elect to not offload the CP traffic to edge network 105-E or core network 105-C, and CCF 125-FE may handle the CP traffic of the latency intolerant type of service.

CCF 125 identifies an overload condition(s) and offloads CP traffic to another CCF instance, or to another selected CP network function, based on the identified overload condition(s) (block 735). Based on the identification of an overload condition in current, or predicted, CP traffic loads (e.g., determined in block 715), CCF 125 may switch and offload traffic to another CCF instance 125, or to another CP network function. For example, referring to FIG. 5, CCF 125-E, based on an overload condition at CCF 125-E itself, may offload CP traffic to CCF 125-FE or CCF 125-C. As another example, referring to FIG. 6A, CCF 125 may offload CP traffic, currently being handled by SMF 155-1, to another instance of SMF 155-2 for handling if a current, or predicted, overload condition occurs at SMF 155-1.

Blocks 725, 730, and 735 are shown as occurring in a particular sequence, however, these blocks may occur in a different order than that shown. For example, the sequence may occur in the following order: block 735, 730, 725; or in the following order: block 730, 735, 725. Alternatively, one or more of blocks 725, 730, and 735 may occur in parallel with the other blocks. For example, blocks 725 and 730 may occur in parallel, followed by block 735. Or blocks 725, 730, and 735 may each be executed in parallel with one another.

Blocks 700-735 may be repeated for each CP packet, or multiple CP packets, of a flow of CP packets received from a particular source (e.g., network function_1) and destined for a particular destination (e.g., network function_2). Therefore, multiple instances of the exemplary process may be repeated in parallel to process multiple different CP packet flows.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 7, the order of the blocks may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a first Communication Control Function (CCF) instance implemented at a network device, control plane (CP) traffic transiting from a source network function (NF) instance to a first destination NF instance in a first mobile network;
determining, by the first CCF instance, CP traffic loads handled by network functions of the first mobile network;
determining, by the first CCF instance, availability of CP resources within the first mobile network;
identifying, by the first CCF instance, a buffer overload condition at least one of the first CCF instance or the first destination NF instance; and
performing, by the first CCF instance, overload protection by offloading the CP traffic from the first CCF instance to a second CCF instance, and/or from the first destination NF instance to a second destination NF instance based on the identified buffer overload condition.

2. The method of claim 1, wherein the mobile network comprises a Fifth Generation (5G) mobile network.

3. The method of claim 1, wherein the network functions comprise at least one of a Policy Control Function (PCF), a Unified Data Management (UDM) function, a Network Slice Selection Function (NSSF), an Authentication Server Function (AUSF), an Access and Mobility Management Function (AMF), a Session Management Function (SMF), or a User Plane Function (UPF).

4. A network device, comprising:
a communication interface to receive control plane (CP) traffic transiting a first mobile network; and
one or more processors, or logic, to:
identify a type of service associated with the CP traffic,
determine a latency tolerance associated with the identified type of service,
determine CP traffic loads handled by network functions of the first mobile network,
determine availability of CP resources within the first mobile network, and
perform at least one of load balancing, network selection or overload protection, when switching the CP traffic from a source to a destination, based on the determined CP traffic loads and/or the determined availability of CP resources,
wherein performing the network selection is further based on the determined latency tolerance.

5. The network device of claim 4, wherein the source of the CP traffic comprises a first network function and wherein the destination comprises a second network function.

6. The network device of claim 4, wherein the first mobile network comprises a Fifth Generation (5G) mobile network.

7. The network device of claim 4, wherein the network functions comprise at least one of a Policy Control Function (PCF), a Unified Data Management (UDM) function, a Network Slice Selection Function (NSSF), an Authentication Server Function (AUSF), an Access and Mobility Management Function (AMF), a Session Management Function (SMF), or a User Plane Function (UPF).

8. The network device of claim 4, wherein the load balancing comprises:
switching the CP traffic to divide the CP traffic among multiple instances of one of the network functions.

9. The network device of claim 4, wherein the overload protection comprises:
offloading at least a portion of the CP traffic to a second network device, or to a second instance of one of the network functions.

10. A non-transitory storage medium storing instructions executable by a network device, wherein the instructions comprise instructions to cause the network device to:
receive control plane (CP) traffic transiting a first mobile network;
identify, in response to receiving the CP traffic, a type of service associated with the CP traffic;
determine a latency tolerance associated with the identified type of service;
determine CP traffic loads handled by network functions of the first mobile network;
determine availability of CP resources within the first mobile network; and
perform at least one of load balancing, network selection, or overload protection, when switching the CP traffic from a source to a destination, based on the determined CP traffic loads and/or the determined availability of CP resources,
wherein performing the network selection is further based on the determined latency tolerance.

11. The method of claim 1, wherein identifying the buffer overload condition further comprises:
determining at least one of current or predicted CP traffic loads at the first CCF instance and the first destination NF instance;
determining buffer sizes associated with each of the first CCF instance and the first destination NF instance; and
identifying the buffer overload condition at the at least one of the first CCF instance or the first destination NF instance based on the determined at least one of current or predicted CP traffic loads and the determined buffer sizes.

12. The method of claim 1, wherein identifying the buffer overload condition further comprises:
predicting CP traffic loads at the first CCF instance and the first destination NF instance, based on a known history of CP traffic loads, to generate predicted CP traffic loads; and
identifying the buffer overload condition at the at least one of the first CCF instance or the first destination NF instance based on the predicted CP traffic loads.

13. The network device of claim 4, wherein, when performing the network selection, the one or more processors, or logic, further:
selects one of a far edge, edge, or core network based on the determined latency tolerance.

14. The non-transitory storage medium of claim 10, wherein the instructions to cause the network device to perform the network selection further comprise instructions to cause the network device to:
select one of a far edge, edge, or core network based on the determined latency tolerance.

15. A method, comprising:
receiving, by a network device, control plane (CP) traffic transiting a first mobile network;
determining, by the network device, CP traffic loads handled by network functions of the first mobile network;
determining, by the network device, availability of CP resources within the first mobile network; and
performing, by the network device, at least one of load balancing, network selection or overload protection, when switching the CP traffic from a source to a destination, based on the determined CP traffic loads and/or the determined availability of CP resources,
wherein the network device comprises a first instance of a CP communication control function (CCF) residing in the first mobile network, and
wherein performing the network selection further comprises:
switching the CP traffic from the first instance of the CCF to a second instance of the CCF residing in a second mobile network based on the determined CP traffic loads and/or the determined availability of CP resources.

16. The method of claim 15, wherein the first mobile network comprises a far edge network and wherein the second mobile network comprises an edge network.

17. The method of claim 15, wherein the first mobile network comprises an edge network and wherein the second mobile network comprises a core network.

18. The method of claim 15, wherein the mobile network comprises a Fifth Generation (5G) mobile network.

19. The method of claim 15, wherein the network functions comprise at least one of a Policy Control Function (PCF), a Unified Data Management (UDM) function, a Network Slice Selection Function (NSSF), an Authentication Server Function (AUSF), an Access and Mobility Management Function (AMF), a Session Management Function (SMF), or a User Plane Function (UPF).

* * * * *